United States Patent
Sung et al.

(10) Patent No.: US 10,512,037 B1
(45) Date of Patent: Dec. 17, 2019

(54) CONTROLLING CELL SELECTION BASED ON RELATIVE DEVICE-TYPE PRIORITIZATION

(71) Applicant: Sprint Spectrum L.P., Overland Park, KS (US)

(72) Inventors: Sanghoon Sung, Ashburn, VA (US); Yun Sung Kim, Ashburn, VA (US); Minho Song, Ashburn, VA (US); Hau Tran, Centerview, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/295,993

(22) Filed: Mar. 7, 2019

(51) Int. Cl.
*H04W 48/20* (2009.01)
*H04W 48/16* (2009.01)

(52) U.S. Cl.
CPC .......... *H04W 48/20* (2013.01); *H04W 48/16* (2013.01)

(58) Field of Classification Search
CPC ..... H04W 48/20; H04W 48/16; H04W 48/00; H04W 48/18; H04W 88/02; H04W 88/08; H04W 88/06; H04W 88/12; H04W 88/10; H04W 72/10; H04W 72/1242; H04W 72/1247; H04W 48/02; H04W 48/04; H04W 48/06; H04W 48/08; H04W 48/10; H04W 48/12; H04W 48/14; H04W 48/17; H04W 72/00; H04W 72/02; H04W 16/18; H04W 16/00; H04W 72/04; H04W 76/00; H04W 76/10; H04W 76/11; H04W 88/00; H04W 28/0215; H04W 74/0875; H04W 74/02; H04B 1/401
See application file for complete search history.

(56) References Cited

U.S. PATENT DOCUMENTS

| 8,731,606 | B2 * | 5/2014 | Yoshihara et al. ......... 455/552.1 |
| 8,929,907 | B1 | 1/2015 | Vargantwar et al. |
| 9,894,602 | B1 | 2/2018 | Manchanda et al. |
| 9,912,450 | B2 * | 3/2018 | McNamara et al. ........................ H04L 5/0007 |
| 10,070,440 | B2 * | 9/2018 | McNamara et al. .. H04W 72/00 |
| 2006/0198350 | A1 * | 9/2006 | Kim ............................ 370/338 |
| 2009/0122782 | A1 * | 5/2009 | Horn et al. ................... 370/350 |
| 2009/0131110 | A1 * | 5/2009 | Balachandran et al. ... 455/456.1 |
| 2010/0067436 | A1 * | 3/2010 | Kouda et al. ................. 370/328 |
| 2012/0307739 | A1 * | 12/2012 | Ishihara et al. ............... 370/328 |
| 2013/0100924 | A1 * | 4/2013 | Striuli et al. .......... H04W 72/04 |
| 2015/0327133 | A1 | 11/2015 | Yiu et al. |
| 2016/0157170 | A1 * | 6/2016 | Daoud Triki et al. ....................... H04W 48/18 |
| 2017/0019802 | A1 * | 1/2017 | Ode ...................... H04W 16/32 |
| 2017/0367036 | A1 * | 12/2017 | Chen et al. ........... H04W 48/16 |

(Continued)

*Primary Examiner* — Meless N Zewdu

(57) ABSTRACT

In an wireless communication system, base stations will be set to prioritize serving one type of user equipment device (UE) over another type of UE, and each base station's respective prioritization will be conveyed to UEs to facilitate base station selection. That way, when a UE faces a choice of whether to connect with one base station or another, the UE could determine which base station gives higher priority to the UE's type and could connect with that base station, even if the UE detects stronger coverage of the other base station. And if the UE finds itself in coverage of a base station that gives lower priority to the UE's type than to another UE type, the UE could still connect with that base station unless the UE finds another base station that gives higher priority to the UE's type.

20 Claims, 4 Drawing Sheets

(56) References Cited

U.S. PATENT DOCUMENTS

2018/0063841 A1* 3/2018 Song et al. ....... H04W 72/0453
2019/0037417 A1 1/2019 Lei et al.

* cited by examiner

US 10,512,037 B1

CONTROLLING CELL SELECTION BASED ON RELATIVE DEVICE-TYPE PRIORITIZATION

BACKGROUND

A cellular wireless network typically includes a number of cell sites including base stations that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Further, each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the base station and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

OVERVIEW

When a UE enters into coverage of an example network, the UE could detect threshold strong coverage of a base station (e.g., a threshold strong reference signal broadcast by the base station) and could then engage in random-access and Radio Resource Control (RRC) signaling to establish an RRC connection through which the base station will then serve the UE. Further, if the UE is not already registered for service with the core network, the UE could transmit to the base station an attach request, which the base station could forward to a core-network controller for processing. And the core-network controller could then coordinate setup for the UE of one or more bearers extending between the UE and a core-network gateway that provides transport-network connectivity.

Once the UE is so connected and registered, the base station could then serve the UE in a connected mode, managing downlink air-interface communication of packet data to the UE and uplink air-interface communication of packet data from the UE.

For example, when packet data for the UE arrives at the core network from a transport network, the data could flow to the UE's serving base station, and the base station could then schedule and provide transmission of that data to the UE on particular downlink PRBs. Likewise, when the UE has data to transmit on the transport network, the UE could transmit a scheduling request to the base station, the base station could responsively schedule transmission of that data from the UE on particular uplink PRBs, and the UE could accordingly transmit the data to the base station for forwarding through the core network to the transport network.

Further, when a UE is served by a base station, the UE could monitor coverage strength of the base station and of neighboring base stations. And if and when the UE determines that certain defined coverage strength thresholds are met (such as neighboring coverage being threshold stronger than serving coverage), the UE could signal to its serving base station, and the serving base station could then coordinate handover of the UE to the neighboring base station.

As the industry advances from one generation of wireless technology to the next, networks and UEs may also support simultaneous connectivity on connections according to multiple different RATs. With the transition from 4G to 5G, for instance, a wireless operator that provides cell sites with 4G base stations could upgrade those cell sites to include 5G base stations as well and to support an arrangement referred to as EUTRA-NR Dual Connectivity (EN-DC). Further, new UEs could be configured with both 4G and 5G radios and with logic to support EN-DC operation.

With EN-DC, a cell site's 4G base station functions a master node and anchor for signaling with the core network, and the cell site's 5G base station functions as a secondary node to provide added connectivity for served UEs.

When a UE that supports EN-DC service enters into such a cell site, the UE could initially scan for and detect coverage of the cell site's 4G base station and engage in signaling to establish a 4G connection between the UE and the 4G base station as discussed above. In turn, perhaps having determined from profile data that the UE is EN-DC capable, the 4G base station could then work with the core network and the 5G base station to establish a 5G connection between the UE and the 5G base station and to establish bearer connectivity for the UE between the 5G base station and the core network. With these 4G and 5G connections so established, the 4G and 5G base stations could then serve the UE with packet-data communications concurrently on their respective connections with the UE, with a portion of data flowing over the UE's 4G connection with the 4G base station concurrently with another portion of the data flowing over the UE's 5G connection with the 5G base station.

More generally, dual-connectivity service of a UE may involve the UE having co-existing connections according to multiple different RATs and being served with communication concurrently on those multiple different-RAT connections, which might provide the UE with increased peak data rate. This is to be distinguished from standalone (or single-connectivity) service of a UE, where the UE is served with communication according to just a single RAT, such as with just a 4G connection or just a 5G connection.

As a wireless operator upgrades its network from providing service according to a first RAT to additionally providing service according to a second RAT and providing dual-connectivity service on the two RATs, the operator may do so progressively from cell site to cell site. As a result, at least during that transition, some of the network's first-RAT base stations may support providing first-RAT service and providing dual-connectivity service through interworking with second-RAT base stations, while other of the network's first-RAT base stations may support providing just first-RAT service and not dual-connectivity service.

Further, the development of UEs that are configured to support dual-connectivity service may also be progressive. Thus, for at least some time, some UEs may support engaging in first-RAT service and engaging in dual-connectivity service, while other UEs may support engaging in first-RAT service but not engaging in dual-connectivity service.

For instance, as an operator upgrades its network to add 5G base stations and to configure 4G base stations to support EN-DC service through interworking with the 5G base stations, some of the network's 4G base stations may support providing 4G service and also providing EN-DC service (EN-DC-capable base stations), while other of the network's 4G base stations may support providing just 4G service but may not yet support providing EN-DC service (4G-only base stations). Likewise, some UEs may support engaging in 4G service and engaging in EN-DC service (EN-DC-capable UEs), while other UEs may support engaging in 4G service but may not support engaging in EN-DC service (4G-only UEs).

In this or similar situations, it may be worthwhile to have the base stations that support providing dual-connectivity service serve the UEs that support engaging in dual-connectivity service and have the base stations that support providing standalone service but not dual-connectivity service serve the UEs that support standalone service but not dual-connectivity service.

For instance, with EN-DC, it may be worthwhile to have EN-DC-capable base stations serve EN-DC-capable UEs and to have 4G-only base stations serve 4G-only UEs. Thus, when a UE faces a choice of whether connect with an EN-DC-capable base station or rather a 4G-only base station, it may be worthwhile to have the UE connect with the EN-DC-capable base station if the UE is EN-DC-capable, but to have the UE instead connect with the 4G-only base station if the UE is 4G-only. This segregation of UEs among the cell sites could help to ensure that sufficient 4G capacity exists to serve UEs that cannot benefit from EN-DC.

Continuing with EN-DC by example, one way to help achieve this goal is to impose different coverage-strength thresholds (or associated measurement biases) at different 4G base stations for different types of UEs. For instance, for establishing connectivity with an EN-DC-capable base station, EN-DC-capable UEs could be made to apply more liberal coverage-strength thresholds than 4G-only UEs, to help promote connection of EN-DC-capable UEs with the EN-DC-capable base station and to help deter connection of 4G-only UEs with the EN-DC-capable base station. And likewise, for establishing connectivity with a 4G-only base station, 4G-only UEs could be made to apply more liberal coverage-strength thresholds than EN-DC-capable UEs, to help promote connection of 4G-only UEs with the 4G-only base station and to help deter connection of EN-DC-capable UEs with the 4G-only base station.

These different coverage-strength thresholds could be imposed for initial UE connectivity and/or for handover and could be facilitated by base station broadcasts and/or pre-provisioned UE configurations.

For instance, to facilitate initial base-station selection, each base station could broadcast a message that specifies different coverage-strength thresholds respectively for EN-DC-capable UEs and 4G-only UEs. And EN-DC-capable base stations could specify a more liberal coverage-strength threshold to be applied by EN-DC-capable UEs than to be applied by 4G-only UEs, while 4G-only base stations could specify a more liberal coverage-strength threshold to be applied by 4G-only UEs than to be applied by EN-DC-capable UEs. When a UE is within coverage of either such base station, the UE could thus read the base station's broadcast message to determine based on whether the UE is EN-DC-capable or 4G-only which coverage-strength threshold to apply, and the UE could accordingly apply that coverage-strength threshold as a basis to determine whether to connect with the base station.

And likewise, to facilitate handover, a UE's serving base station could provide the UE with different handover coverage-strength thresholds to be applied based on whether the UE is EN-DC capable or rather 4G-only, based on whether the serving base station is EN-DC-capable or rather 4G-only, and/or based on whether a neighboring base station whose coverage the UE detects is EN-DC capable of rather 4G-only. And these coverage-strength thresholds could be configured to promote having EN-DC-capable UEs be served by EN-DC-capable base stations and to promote having 4G-only UEs be served by 4G-only base stations.

Unfortunately, however, use of coverage-strength thresholds in this manner can lead to some undesired results.

For example, consider a scenario where the coverage-strength threshold for 4G-only UEs to connect with an EN-DC-capable base station is set relatively high in an effort to deter the 4G-only UEs from connecting with the EN-DC-capable base station. In that scenario, if a 4G-only UE finds itself within coverage of just that EN-DC-capable base station and has coverage-strength lower than the defined threshold, the 4G-only UE may be altogether unable establish wireless connectivity. Further, in the same scenario, if a 4G-only UE finds itself within very strong coverage of that EN-DC-capable base station, the 4G-only UE may connect with that base station even if the 4G-only UE is also within acceptable coverage of a 4G-only base station.

Disclosed herein is an improved solution.

In accordance with the disclosure, to help segregate UEs among base stations in a manner that aligns the base stations' service capabilities with the UEs' service capabilities, base stations will be set to prioritize one type of UE over another type of UE, and each base station's respective prioritization will be conveyed to UEs to facilitate base station selection. That way, when a UE faces a choice of whether to connect with one base station or another, the UE could determine which base station gives higher priority to the UE's type and could connect with that base station, even if the UE detects stronger coverage of the other base station. And if the UE finds itself in coverage of a base station that gives lower priority to the UE's type than to another UE type, the UE could still connect with that base station unless the UE finds another base station that gives higher priority to the UE's type.

This process could be implemented in various ways. As to initial connections, for instance, each such base station could broadcast a specification of its prioritization of one type of UE over another, so that UEs could read that broadcast prioritization data when initially selecting a base station to connect with and could use the prioritization data as a basis to make the selection. Further or alternatively, when a base station releases a UE's connection, the base station could include in its connection-release message to the UE a specification of the base station's prioritization of one type of UE over another, and the UE could use that prioritization data when the UE next considers whether to re-connect with that base station. And still further alternatively, when a base station is serving a UE, the base station could provide the UE with neighbor data that specifies for each of one or more neighboring base stations the neighboring base station's prioritization of one type of UE over another, and the UE could use that prioritization data when evaluating whether to hand over (or request handover) from the serving base station to another base station.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
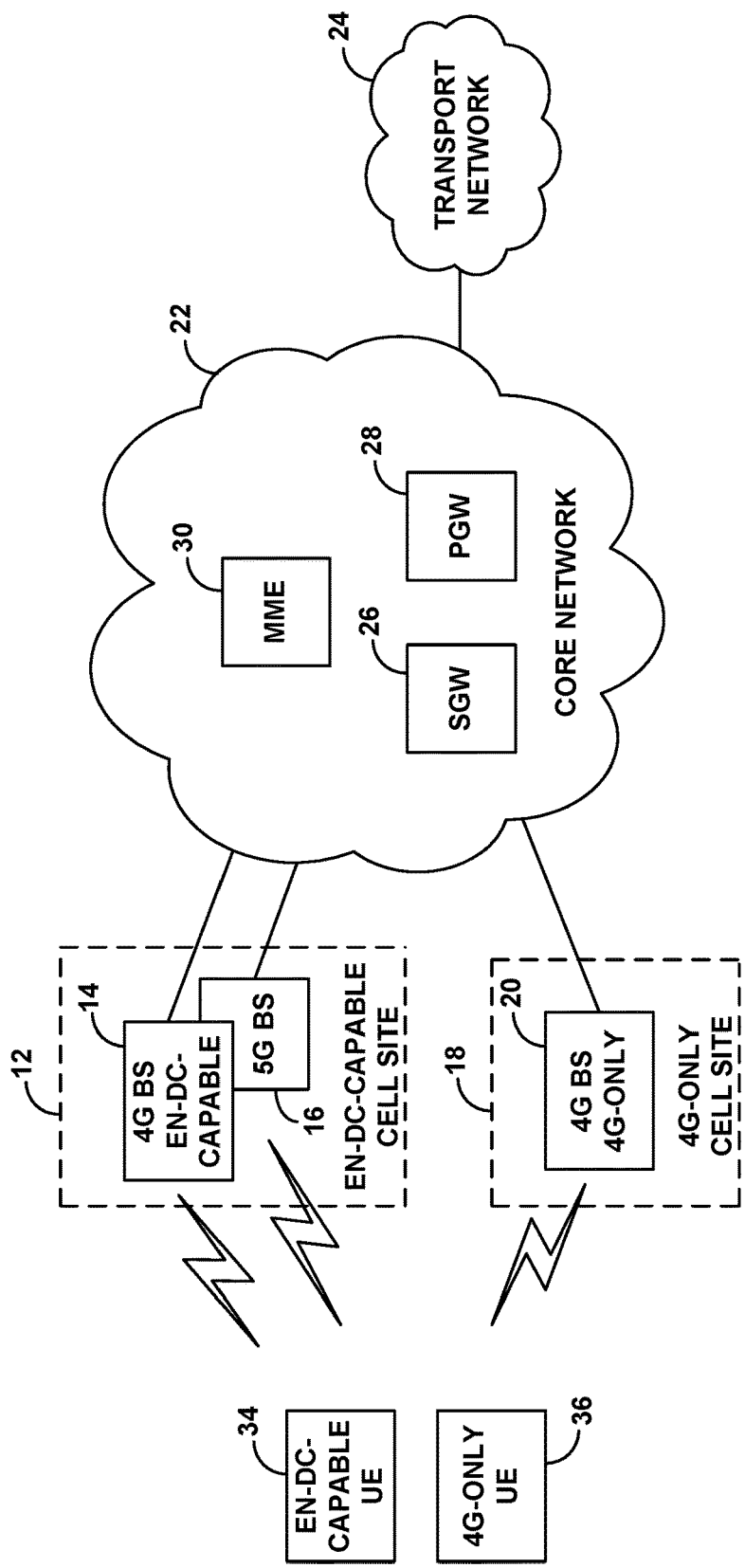
FIG. 1 is a simplified block diagram of an example wireless communication system in which various disclosed features can be implemented.

An example implementation will now be described in the context of 4G LTE and 5G NR service and particularly in the context of a network that includes some EN-DC capable cell sites with EN-DC capable 4G base stations and some 4G-only cell sites with 4G-only base stations. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including an EN-DC-capable cell site 12 having an EN-DC-capable 4G base station 14 and a 5G base station 16, and a 4G-only cell site 18 having a 4G-only base station 20 and not having a 5G base station. (Note that these example cell sites might also support one or more other RATs aside from these, such as one or more legacy RATs for instance. But the focus of the example discussion here will be just 4G and 5G.)

Each of these cell sites could be at a respective location within a region, and the two example cell sites could be adjacent to each other such that a UE could be in overlapping coverage of the two cell sites and might be able to hand over from one cell site to the other.

In addition, each base station could also take various forms. For instance, a base station could be a macro base station of the type that would typically include a tower mounted antenna structure for providing a broad range of coverage. Or a base station could be a small cell base station, femtocell base station, relay base station, or other type of base station that might have a smaller form factor with an antenna structure that provides a narrower range of coverage. Further, at cell site 12, the 4G and 5G base stations might share an antenna tower and/or other such structures. Other arrangements are possible as well.

Base stations 14, 16, and 20 are each shown coupled with an example core network 22. Core network 22 could be an evolved packet core (EPC) network, a next generation core (NGC) network, or another network including components supporting an applicable radio access technology and providing connectivity with at least one transport network 24, such as the Internet.

In an example implementation as shown, the core network 22 includes a serving gateway (SGW) 26, a packet data network gateway (PGW) 28, and a mobility management entity (MME) 30. In practice, each base station could have an interface with the SGW and an interface with the MME, the MME could have an interface with the SGW, the SGW could have an interface with the PGW, and the PGW could provide connectivity with the transport network. With this arrangement, the SGW and PGW cooperatively provide user-plane connectivity between each base station and the transport network, to enable a UE served by a base station to engage in communication on the transport network. And the MME operates as a controller to carry out operations such as coordinating UE attachment and setup of user-plane bearers.

As noted above, the air interface between each base station and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

Note also that the 4G air interface and 4G service provided respectively by 4G base stations 14 and 20 could differ from the 5G air interface and 5G service provided by 5G base station 16 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In operation, when a UE enters into coverage of the base station on a carrier, the UE could detect the base station's synchronization signal and could then read the base station's MIB or the like to determine the carrier's bandwidth and could read the base station's SIB to determine other operational parameters. Further, the UE could determine coverage strength from the base station, such as reference signal receive strength (RSRP) or reference signal receive quality (RSRQ), among other possibilities. And if the UE determines that the coverage is sufficient strong, the UE could then engage in random access signaling and RRC configuration signaling with the base station as discussed above to connect with the base station, thus putting the UE in an RRC-connected mode.

In addition, once the UE is connected with the base station, the UE could then transmit to the base station an attach request if appropriate, which the base station could forward to the MME for processing. And after authenticating the UE, the MME could coordinate setup for the UE of a user-plane bearer between the base station and the PGW, to enable the UE to engage in communication on the transport network. Further, the base station could coordinate establishment for the UE of a corresponding data radio bearer between the UE and the base station, and the base station could record the operational state of the UE.

The base station could then serve the UE with data communications as discussed above.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

FIG. 1 depicts two examples UEs 34, 36 that could be operating in coverage of cell site 12 and/or cell site 18.

UE 34 is shown being an EN-DC-capable UE. As such, UE 34 would include a 4G radio for connecting with and being served by a 4G base station, and a 5G radio for connecting with and being served concurrently by a 5G base station. Further, UE 34 would have logic and perhaps an associated service-subscription, enabling the UE to engage in EN-DC service when available.

Thus, in the arrangement of FIG. 1, UE 34 could connect with 4G base station 14 or 4G base station 20 and could engage in standalone 4G service provided by that base station. Further, if the UE connects with EN-DC-capable 4G base station 14, that 4G base station could then coordinate setup of EN-DC service for the UE and the UE could engage in that EN-DC service. For instance, 4G base station 14 could engage in signaling with 5G base station 16 and with the UE to arrange for setup of a 5G connection between 5G base station 16 and the UE, and 4G base station 14 could engage in signaling with the MME 30 to arrange for splitting of the UE's user-plane bearer to facilitate data communication concurrently through the 4G base station 14 and the 5G base station 16. Packet-data could then be scheduled on PRBs to flow concurrently over the UE's 4G and 5G connections, between the UE and the core network.

Whereas, UE 36 is shown being a 4G-only UE. As such, UE 36 would include a 4G radio for connecting with and being served by a 4G base station but may not include a 5G radio or may not include logic or service-subscription support for engaging in EN-DC service. Thus, UE 36 could connect with 4G base station 14 or 4G base station 20 and could engage in standalone 4G service provided by that base station. But UE 36 would not engage in EN-DC service.

When any such UE is being served by one of the illustrated base stations or by another base station, the UE may also monitor coverage strength of its serving base station and of one or more other neighboring base stations, to facilitate handover when be appropriate.

For instance, when the UE is served by a 4G base station (with or without added 5G connectivity) and the UE detects and reports that its serving coverage is threshold weak, the serving 4G base station may then transmit to the UE a measurement object that directs the UE to scan for target 4G coverage for possible handover. Such a measurement object could provide the UE with a list of neighboring 4G base station coverage areas and could specify one or more coverage-strength thresholds as discussed above. And if and when the UE detects target 4G coverage that meets a specified threshold, the UE could then report that detected coverage to its serving 4G base station, and the 4G base station could responsively coordinate handover of the UE to the neighboring 4G base station.

In addition, when any such UE is served in a connected mode by one of the illustrated base stations or by another base station, the UE's RRC connection with that base station could be released after a period of inactivity (e.g., absence of packet-data flow for a threshold period of time) or in response to one or more other triggers. And as part of releasing the UE's connection, the UE's serving base station could transmit to the UE an RRC connection-release message, transitioning the UE to an RRC-idle mode. And in that mode, if and when the UE seeks to engage in packet-data communication, the UE could once again scan for coverage and engage in signaling to establish an RRC connection.

As noted above, the present disclosure provides a mechanism that could help promote having EN-DC-capable UEs such as UE 34 connect with and be served by EN-DC-capable base stations such as 4G base station 14 rather than 4G-only base stations such as 4G base station 20, and having 4G-only UEs such as UE 36 connect with and be served by 4G-only base stations such as 4G base station 20 rather than EN-DC-capable base stations such as 4G base station 14.

Per the disclosure as noted above, each base station could have an associated prioritization of UE types based on the base station's service support, and UEs could be provided with that prioritization data in order to make an educated decision of whether to be served by one base station or another.

For instance, each EN-DC-capable base station could prioritize serving EN-DC-capable UEs over serving 4G-only UEs, and a specification of that prioritization could be provided for use by any UE that may be considering whether to connect with the EN-DC capable base station. And each 4G-only base station could prioritize serving 4G-only UEs over serving EN-DC-capable UEs, and a specification of that prioritization could be provided for use by any UE that may be considering whether to connect with the 4G-only base station.

As noted above, such prioritization data could be provided to a UE in various contexts, and a UE could decide, based on the prioritization data and based on the UE's type, whether to select and connect with one base station or another.

By way of example, each 4G base station could broadcast a specification of its prioritization of one type of UE over another, to enable UEs to learn the base station's prioritization by reading the base station's broadcast specification. For instance, each 4G base station could include in one of its a SIB broadcast messages a specification of the base station's relative prioritization of serving EN-DC-capable UEs versus serving 4G-only UEs, such as an ordered list that ranks one type of UE over the other. Or the base station could specify relative prioritization in other ways, such as by specifying for each type of UE a binary "0" to indicate that the base station gives that type of UE low priority or a binary "1" to indicate that the base station gives that type of UE high priority.

Thus, when a UE is scanning for initial connectivity or for handover, the UE could read this prioritization data from each candidate base station's broadcast message, and the UE could thereby determine that one candidate base station gives higher priority to the UE's type than another candidate base station gives and, based at least on that determination (and possibly further based on coverage-thresholds), could select that one base station to connect with rather than selecting the other base station to connect with.

As a related example, each 4G base station could also transmit a specification of its prioritization to a UE when the base station releases its connection with the UE, so that the UE can refer to that prioritization as a basis to determine whether re-connect with the same base station the next time the UE seeks to connect. For instance, the 4G base station could include its prioritization data with an RRC connection-release message that the 4G base station sends to a UE to release the UE's RRC connection. And the UE could thus receive that message and read the specification in order to determine the base station's relative prioritization of serving EN-DC UEs versus serving 4G-only UEs.

When the UE then seeks to scan for coverage and newly establish an RRC connection in order to engage in packet-data communication, the UE could take into account the prioritization data that its most recently serving base station provided. For instance, if the prioritization data indicates that the base station gives relatively low priority to the UE's type, then the UE could responsively scan for coverage of a different base station that would give higher priority to the UE's type. Whereas, if the prioritization data indicates that the base station gives high priority to the UE's type (and perhaps if the UE does not detect coverage of another base station that gives higher priority to the UE's type), then the UE could responsively seek re-connection with the same base station.

As another example, each 4G base station could be provisioned with neighbor data for one or more neighboring base station, specifying for each of one or more neighboring base stations the neighboring base station's prioritization of one type of UE over another. And a 4G base station could provide that neighbor data to a served UE to enable the UE to consider the data when selecting a target 4G base station for handover. For instance, when a 4G base station provides such a UE with a measurement object to cause the UE to scan for coverage of various neighboring 4G base stations, the serving 4G base station could include in the measurement object a specification of each neighboring base station's respective prioritization of serving EN-DC-capable UEs versus serving 4G-only UEs.

Thus, as the UE considers which of the target base stations to hand over to, the UE could take each base station's prioritization data into account. For instance, from that provided data, the UE could likewise determine that one candidate target base station gives higher priority to the UE's type than another candidate target base station gives and, based at least on that determination (and possibly further based on coverage-thresholds), could select that one candidate target base station to hand over to. And the UE could then engage in signaling with its serving base station to trigger that handover.

As a practical example in line with the discussion above, consider a scenario in FIG. 1 where EN-DC-capable UE 34 is within coverage of both EN-DC-capable base station 14 and 4G-only base station 20, and where UE 34 is seeking to decide whether to connect with base station 14 or rather to connect with base station 20. This situation could arise when UE 34 is in an idle mode and is scanning for connectivity or when UE 34 is connected and is scanning for possible handover.

In this scenario, UE 34 may refer to the prioritization data respectively of each of those 4G base stations received by UE 34 in any of the manners described above, among other possibilities. Based on that data, UE 34 could then determine that (i) base station 14 gives higher priority to serving EN-DC-capable UEs than to serving 4G-only UEs and (ii) base station 20 gives lower priority to serving EN-DC capable UEs than to serving 4G-only UEs. And so UE 34 could determine that base station 14 gives higher priority to serving EN-DC capable UEs than base station 20 does. Based at least on this determination and given the fact that UE 34 is an EN-DC capable UE, UE 34 could thus decide to select and connect with base station 14 rather than base station 20. And UE 34 could proceed accordingly.

And as another practical example, consider a scenario where 4G-only UE 36 is within coverage of both EN-DC-capable base station 14 and 4G-only base station 20, and where UE 36 is likewise seeking to decide whether to connect with base station 14 or rather to connect with base station 20. This situation could similarly arise when UE 36 is in an idle mode and is scanning for connectivity or when UE 36 is connected and is scanning for possible handover.

In this scenario, UE 36 may likewise refer to the prioritization data respectively of each of those 4G base stations received by UE 36 in any of the manners described above, among other possibilities. Based on that data, UE 36 could then determine that (i) base station 14 gives lower priority to serving 4G-only UEs than to serving EN-DC-capable UEs and (ii) base station 20 gives higher priority to serving 4G-only UEs than to serving EN-DC-capable UEs. And so UE 36 could determine that base station 20 gives higher priority to serving 4G-only UEs than base station 14 does. Based at least on this determination and given the fact that UE 36 is a 4G-only UE, UE 36 could decide to select and connect with base station 20 rather than base station 14. And UE 36 could proceed accordingly.

In a representative implementation, a wireless communication system could thus be configured to control base station selection. In particular, the system could be configured to serve UEs including (i) UEs of a first type that support engaging in standalone service on a first RAT (e.g., 4G LTE) and dual-connectivity service on the first RAT and a second RAT (e.g., 5G NR), and (ii) UEs of a second type that support engaging in the standalone service on the first RAT but that do not support engaging in the dual-connectivity service on the first RAT and the second RAT. And such a system could include a plurality of base stations that each support providing the standalone service on a first RAT, the plurality of base stations including (i) a first base station that additionally supports providing the dual-connectivity service on the first RAT and a second RAT and (ii) a second base station that does not additionally support providing the dual-connectivity service on the first RAT and the second RAT.

Such a system could then be configured to transmit to a UE prioritization data useable by the UE to select, from at least the first and second base stations, a base station to be a serving base station of the UE, the prioritization data including (i) first prioritization data that specifies that the first base station prioritizes serving UEs of the first type over serving UEs of the second type and (ii) second prioritization data that species that the second base station prioritizes serving UEs of the second type over UEs of the first type.

In practice, for instance, the UE could be of the first type, and the prioritization data could cause the UE to select the first base station based at least on a comparison of the first prioritization data with the second prioritization data, such as based on a determination that the first base station gives higher priority than the second base station to serving UEs of the first type. Or the UE could be of the second type, and the prioritization data could cause the UE to select the second base station based at least on a comparison of the first prioritization data with the second prioritization data, such as based on a determination that the second base station gives higher priority than the first base station to serving UEs of the second type.

Figure 2:
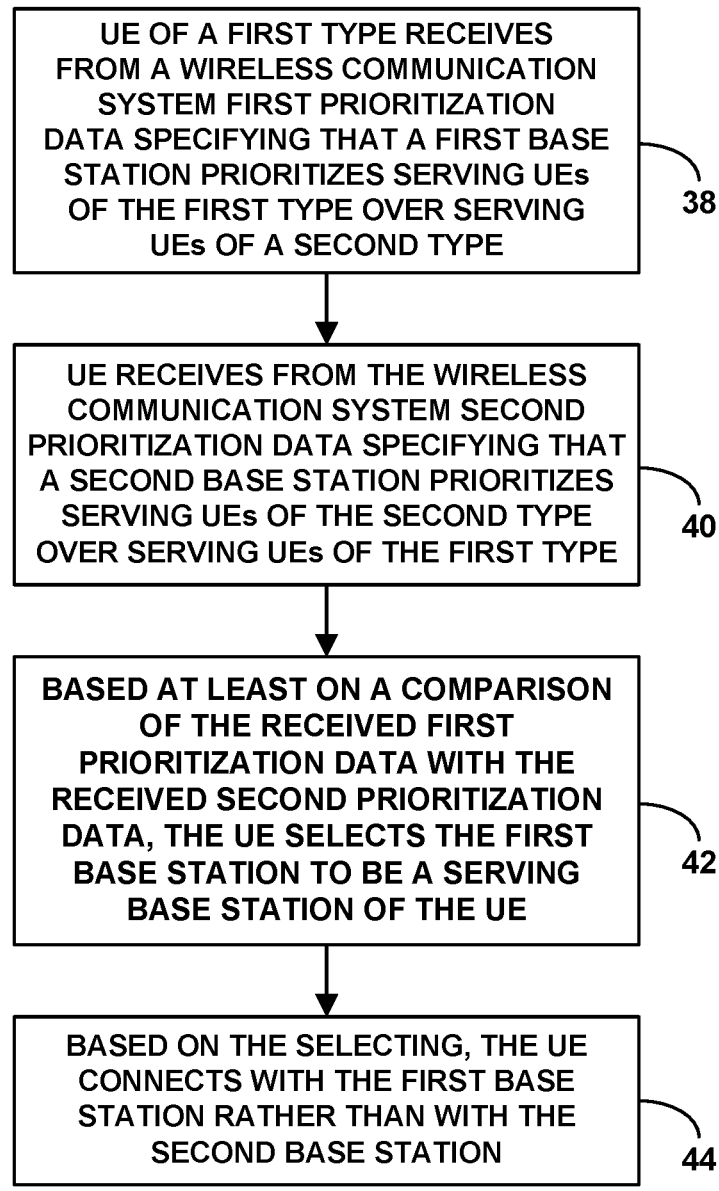
FIG. 2 is a flow chart depicting an example method in accordance with the present disclosure.

FIG. 2 is a flow chart depicting a method that can be carried out in accordance with the present disclosure, to control base station selection by a UE in a wireless communication system that includes a plurality of base stations each supporting service of UEs of a first type and each supporting service of UEs of a second type, the UE at issue being of the first type rather than of the second type.

As shown in FIG. 2, at block 38, the method includes the UE of the first type receiving from the wireless communication system first prioritization data specifying that a first base station of the plurality prioritizes serving UEs of the first type over serving UEs of the second type. And at block 40, the method includes the UE receiving from the wireless communication system second prioritization data specifying that a second base station of the plurality prioritizes serving UEs of the second type over serving UEs of the first type. Further, at block 42, the method includes, based at least on a comparison of the received first prioritization data with the received second prioritization data, the UE selecting the first base station to be a serving base station of the UE. And at block 44, the method includes, based on the selecting, the UE connecting with the first base station rather than with the second base station.

In line with the discussion above, each base station of the plurality of base stations could be configured to support providing standalone service on a first RAT, and first base station could further be configured to support providing dual-connectivity service on the first RAT and a second RAT, whereas the second base station may lack support for providing the dual-connectivity service on the first RAT and the second RAT. And the first RAT could be 4G LTE, the second RAT could be 5G NR, and the dual-connectivity service could be EN-DC, among other possibilities.

Further, the first type of UEs could be UEs that support engaging in the standalone service on the first RAT and engaging in the dual-connectivity service on the first RAT and the second RAT, and the second type of UEs could be UEs that support engaging in the standalone service on the first RAT but that do not support engaging in the dual-connectivity service on the first RAT and the second RAT. Alternatively, the first type of UEs could be UEs that support engaging in the standalone service on the first RAT but that do not support engaging in the dual-connectivity service on the first RAT and the second RAT, and the second type of UEs could be UEs that support engaging in standalone service on the first RAT and engaging in the dual-connectivity service on the first RAT and the second RAT.

In addition, in line with the discussion above, the act of the UE receiving the first prioritization data could involve the UE receiving the first prioritization data (i) in a wireless broadcast from the first base station, (ii) in a connection-release message transmitted from the first base station to the UE, or (iii) in neighbor data from a base station neighboring the first base station. And likewise, the act of the UE receiving the second prioritization data could involve the UE receiving the second prioritization data (i) in a wireless broadcast from the second base station, (ii) in a connection-release message transmitted from the second base station to the UE, or (iii) in neighbor data from a base station neighboring the second base station.

Further, as discussed above, the first prioritization data could comprise an ordered list that ranks the first type over the second type, and the second prioritization data could comprise an ordered list that ranks the second type over the first type, among other possibilities.

And still further, in line with the discussion above, the act of the UE selecting the first base station based at least on the comparison of the received first prioritization data with the received second prioritization data could involve the UE determining based on the comparison that the first base station gives higher priority than the second base station to serving UEs of the first type and, based at least on the determining, the UE selecting the first base station.

In addition, the act of the UE selecting the first base station could be further based on a consideration of one or more coverage-thresholds. For instance, the UE might first identify a set of candidate base stations based on determining that one or more coverage-thresholds is met, and the UE may then use the prioritization data as discussed herein as a basis to select between the identified candidate base stations.

And still additionally, the method of FIG. 2 could be carried out when the UE is in an idle mode rather than a connected mode. Or the method could be carried out when the UE is in a connected mode rather than in an idle mode, in which case the UE selecting of the first base station could comprise the UE selecting the first base station as a handover target for handover of the UE.

Figure 3:
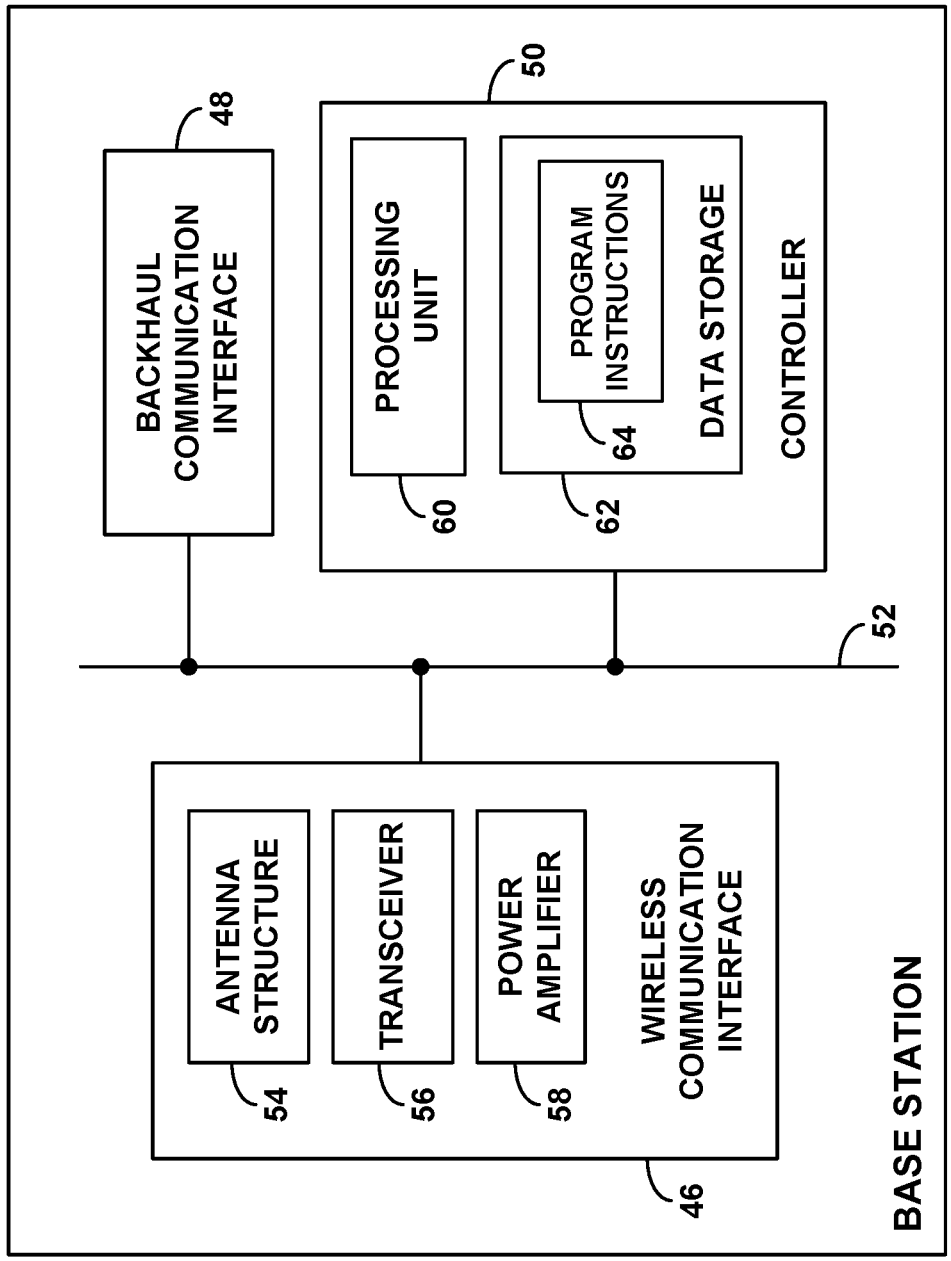
FIG. 3 is a simplified block diagram of an example base station operable in accordance with the present disclosure.

FIG. 3 is a simplified block diagram of an example base station, which could be one of the base stations described above. As shown, the example base station includes a wireless communication interface 46, a backhaul communication interface 48, and a controller 50, which could be integrated or communicatively linked together by a system bus, network, or other connection mechanism 52 and/or could be integrated together or distributed in various ways.

The wireless communication interface 46 could include an antenna structure (e.g., a MIMO antenna array, possibly a massive-MIMO array), a transceiver 56, and a power amplifier 58, among one or more other RF components, to cooperatively facilitate air interface communication with a UE served by the base station. Thus, through the wireless communication interface including the antenna structure, the base station could be configured to provide coverage and service on a representative RAT as described above.

The backhaul communication interface 48 could then include a wireless and/or wireless network communication module configured to support communication with other entities as discussed above.

And the controller 50 could then be configured to carry out various base station operations described herein. For instance, the controller could comprise a processing unit 60 including one or more processors (e.g., general purpose microprocessors and/or dedicated processing units), non-transitory data storage 62 (e.g., one or more volatile and/or non-volatile storage components, such as magnetic, optical or flash storage), and program instructions 64 stored in the non-transitory data storage and executable by the processing unit to cause the base station to carry out the operations.

Various features described above can be implemented in this context as well, and vice versa.

Figure 4:
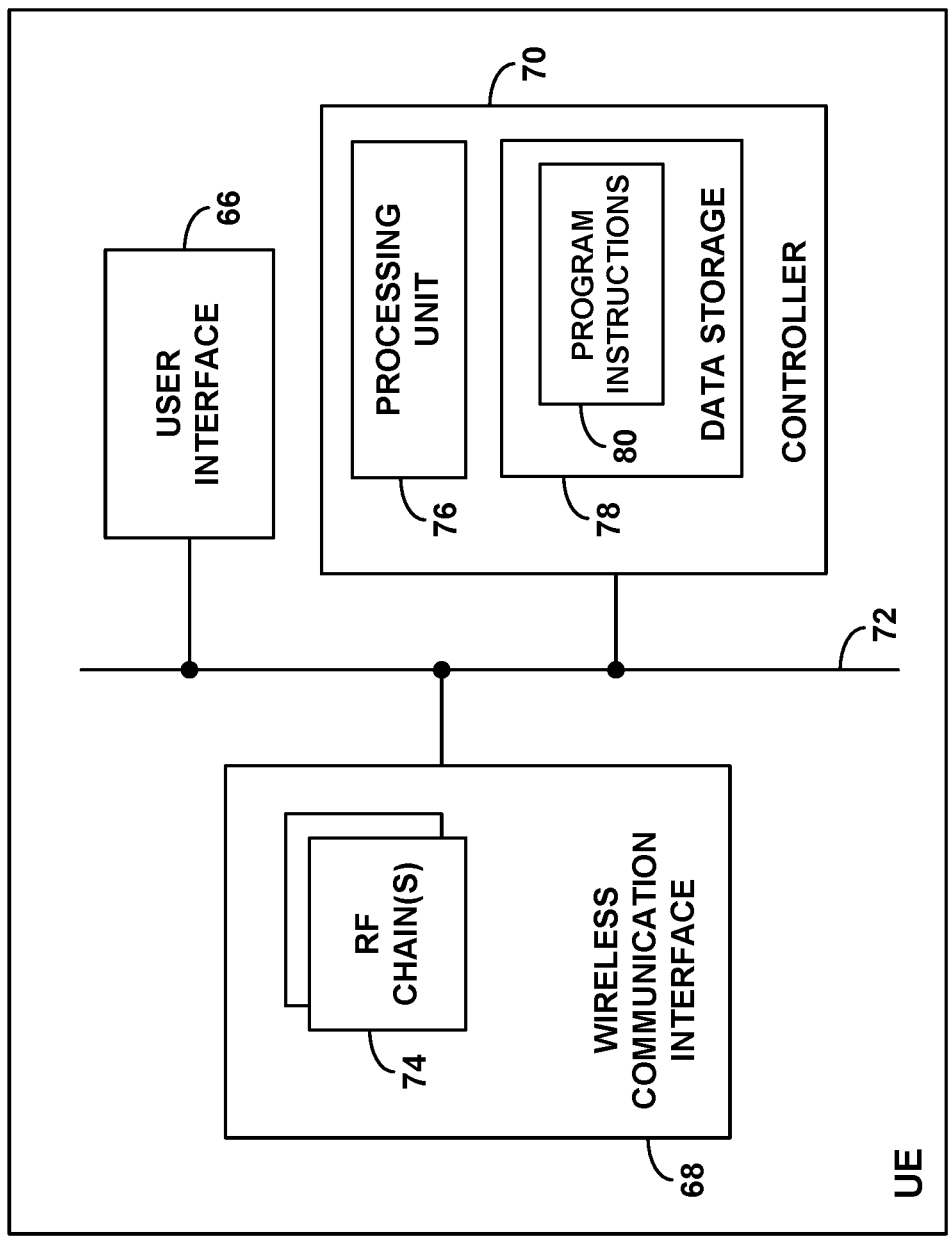
FIG. 4 is a simplified block diagram of an example UE operable in accordance with the present disclosure.

FIG. 4 is next a simplified block diagram of an example UE operable in line with the discussion above. A shown, the example UE includes a user interface 66, a wireless communication interface 68, and a controller 70, all of which may be communicatively linked together by a system bus, network, or other connection mechanism 72 and/or could be integrated together or distributed in various ways.

In this example arrangement, the user interface 66 (which might be omitted if the UE is not user operated, such as if the UE is not user operated) could include input and output components that facilitate user interaction with the UE. And the wireless communication interface 68 could include one or more RF chains 74 and associated logic to support communication according to one or more RATs, including engaging in standalone service on a first RAT and possibly engaging in dual-connectivity service on the first RAT and a second RAT.

Further, controller 70 could comprise control logic to cause the UE to carry out particular UE operations described herein. For instance, the controller 70 could include a processing unit 76 including one or more processors (e.g., general purpose microprocessors and/or dedicated processing units), non-transitory data storage 78 (e.g., one or more volatile and/or non-volatile storage components, such as magnetic, optical, or flash storage), and program instructions 80 stored in the non-transitory data storage and executable by the processing unit 76 to cause the UE to carry out the operations.

Various features described above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling base station selection by a user equipment device (UE) in a wireless communication system comprising a plurality of base stations each supporting service of UEs of a first type and each supporting service of UEs of a second type, wherein the UE is of the first type rather than the second type, the method comprising:

receiving by the UE, from the wireless communication system, first prioritization data specifying that a first base station of the plurality of base stations prioritizes serving the UEs of the first type over serving the UEs of the second type;

receiving by the UE, from the wireless communication system, second prioritization data specifying that a second base station of the plurality of base stations prioritizes serving the UEs of the second type over serving the UEs of the first type;

based at least on a comparison of the received first prioritization data with the received second prioritization data, selecting by the UE the first base station to be a serving base station of the UE; and based on the selecting, connecting by the UE with the first base station rather than with the second base station.

2. The method of claim 1, wherein each base station of the plurality of base stations supports providing standalone service on a first radio access technology (RAT), wherein the first base station further supports providing dual-connectivity service on the first RAT and a second RAT, wherein the second base station does not support providing the dual-connectivity service on the first RAT and the second RAT,
wherein the first type of UEs is UEs that support engaging in the standalone service on the first RAT and engaging in the dual-connectivity service on the first RAT and the second RAT, and
wherein the second type of UEs is UEs that support engaging in the standalone service on the first RAT but that do not support engaging in the dual-connectivity service on the first RAT and the second RAT.

3. The method of claim 2, wherein the first RAT is 4G LTE, wherein the second RAT is 5G NR, and wherein the dual-connectivity service is EN-DC.

4. The method of claim 1,
wherein each base station of the plurality of base stations supports providing standalone service on a first radio access technology (RAT), wherein the second base station further supports providing dual-connectivity service on the first RAT and a second RAT, wherein the first base station does not support providing the dual-connectivity service on the first RAT and the second RAT,
wherein the second type of UEs is UEs that support engaging in the standalone service on the first RAT and engaging in the dual-connectivity service on the first RAT and the second RAT, and
wherein the first type of UEs is UEs that support engaging in the standalone service on the first RAT but that do not support engaging in the dual-connectivity service on the first RAT and the second RAT.

5. The method of claim 4, wherein the first RAT is 4G LTE, wherein the second RAT is 5G NR, and wherein the dual-connectivity service is EN-DC.

6. The method of claim 1,
wherein receiving by the UE the first prioritization data comprises at least one operation selected from the group consisting of (i) receiving by the UE the first prioritization data in a wireless broadcast from the first base station, (ii) receiving by the UE the first prioritization data in a connection-release message transmitted from the first base station to the UE, and (iii) receiving by the UE the first prioritization data from a base station neighboring the first base station, and
wherein receiving by the UE the second prioritization data comprises at least one operation selected from the group consisting of (i) receiving by the UE the second prioritization data in a wireless broadcast from the second base station, (ii) receiving by the UE the second prioritization data in a connection-release message transmitted from the second base station to the UE, and (iii) receiving by the UE the second prioritization data from a base station neighboring the second base station.

7. The method of claim 1,
wherein the first prioritization data comprises an ordered list that ranks the first type of the UEs over the second type of the UEs, and
wherein the second prioritization data comprises an ordered list that ranks the second type of the UEs over the first type of the UEs.

8. The method of claim 1, wherein selecting by the UE the first base station based at least on the comparison of the received first prioritization data with the received second prioritization data comprises:
determining based on the comparison that the first base station gives higher priority than the second base station to serving UEs of the first type; and based at least on the determining, selecting by the UE the first base station.

9. The method of claim 1, wherein selecting by the UE the first base station is further based on consideration of one or more coverage-thresholds.

10. The method of claim 1, wherein the method is carried out when the UE is in an idle mode rather than a connected mode.

11. The method of claim 1, wherein the method is carried out when the UE is in a connected mode rather than in an idle mode, wherein selecting the first base station comprises selecting the first base station as a handover target for handover of the UE.

12. A wireless communication system configured to control base station selection, wherein the wireless communication system is configured to serve user equipment devices (UEs) including (i) UEs of a first type that support engaging in standalone service on a first radio access technology (RAT) and dual-connectivity service on the first RAT and a second RAT, and (ii) UEs of a second type that support engaging in the standalone service on the first RAT but that do not support engaging in the dual-connectivity service on the first RAT and the second RAT, the system comprising:
a plurality of base stations that each support providing the standalone service on a first RAT, wherein the plurality of base stations includes (i) a first base station that additionally supports providing the dual-connectivity service on the first RAT and a second RAT and (ii) a second base station that does not additionally support providing the dual-connectivity service on the first RAT and the second RAT,
wherein the wireless communication system is configured to transmit to a UE prioritization data for use by the UE to select, from at least the first and second base stations, a base station to be a serving base station of the UE, wherein the prioritization data includes (i) first prioritization data that specifies that the first base station prioritizes serving UEs of the first type over serving UEs of the second type and (ii) second prioritization data that specifies that the second base station prioritizes serving UEs of the second type over UEs of the first type,
whereby transmission of the prioritization data facilitates UE selection, from at least the first and second base stations, the base station to be the serving base station of the UE.

13. The wireless communication system of claim 12, wherein the UE is of the first type, and wherein the prioritization data causes the UE to select the first base station based at least on a comparison of the first prioritization data with the second prioritization data.

14. The wireless communication system of claim 12, wherein the UE is of the second type, and wherein the prioritization data causes the UE to select the second base station based at least on a comparison of the first prioritization data with the second prioritization data.

15. The wireless communication system of claim 12, wherein the first RAT is 4G LTE, wherein the second RAT is 5G NR, and wherein the dual-connectivity service is EN-DC.

16. The wireless communication system of claim 12,
wherein the wireless communication system is configured to transmit the prioritization data to the UE through at least one operation selected from the group consisting of (i) transmission in a wireless broadcast from the first base station, (ii) transmission in a connection-release message, and (iii) transmission in data that specifies the prioritization data respectively for each of one or more neighboring base stations.

17. The wireless communication system of claim 12,
wherein the first prioritization data comprises an ordered list that ranks the first type of the UEs over the second type of the UEs, and
wherein the second prioritization data comprises an ordered list that ranks the second type of the UEs over the first type of the UEs.

18. A method for controlling base station selection in a wireless communication system comprising a plurality of base stations, wherein the wireless communication system is configured to serve user equipment devices (UEs) including (i) UEs of a first type that support engaging in standalone service on a first radio access technology (RAT) and dual-connectivity service on the first RAT and a second RAT, and (ii) UEs of a second type that support engaging in the standalone service on the first RAT but that do not support engaging in the dual-connectivity service on the first RAT and the second RAT, the method comprising:

transmitting, by the wireless communication system to a UE, first prioritization data that specifies that a first base station of the plurality prioritizes serving UEs of the first type over serving UEs of the second type, wherein the UE is of the first type or of the second type; and transmitting by the wireless communication system to the UE, second prioritization data that specifies that a second base station of the plurality of base stations prioritizes serving UEs of the second type over serving UEs of the first type, wherein the first and second prioritization data is for use by the UE to select, from at least the first and second base stations, a base station to be a serving base station of the UE.

19. The method of claim 18, wherein the UE is of the first type, and wherein a comparison of the first prioritization data with the second prioritization data causes the UE to select the first base station.

20. The method of claim 18, wherein the UE is of the second type, and wherein a comparison of the first prioritization data with the second prioritization data causes the UE to select the second base station.

* * * * *